United States Patent [19]

Way

[11] 3,814,957

[45] June 4, 1974

[54] PRECISION TEMPERATURE CONTROLLER

[75] Inventor: Allan S. Way, Irvine, Calif.

[73] Assignee: Beckman Instruments, Inc., Fullerton, Calif.

[22] Filed: Feb. 22, 1973

[21] Appl. No.: 334,977

[52] U.S. Cl................. 307/310, 307/254, 307/235, 328/3
[51] Int. Cl. ........................................... H03k 17/00
[58] Field of Search ........ 307/310, 254, 235; 328/3; 219/501

[56] References Cited
UNITED STATES PATENTS

| | | | |
|---|---|---|---|
| 3,426,969 | 2/1969 | Anderson, Jr. ................. | 307/314 X |
| 3,449,599 | 6/1969 | Henery ............................. | 307/310 |
| 3,529,182 | 9/1970 | Jornod................................. | 328/3 |
| 3,675,046 | 7/1972 | Herdenrider et al. .............. | 307/310 |

Primary Examiner—Rudolph V. Rolinec
Assistant Examiner—B. P. Davis
Attorney, Agent, or Firm—R. J. Steinmeyer; John G. Mesaros

[57] ABSTRACT

A precision temperature controller utilizing a temperature sensitive resistive element in thermal relationship to an object to be heated, the element being connected in a bridge circuit to derive an error signal proportional to deviation from a desired temperature, the error signal being summed with a sawtooth voltage, the output so obtained being compared with a reference voltage in an operational amplifier to derive a pulsed output having a pulse width proportional to the error signal, the pulse width being used to control the time duration of energization of a heating element in proximity to the resistive element.

5 Claims, 1 Drawing Figure

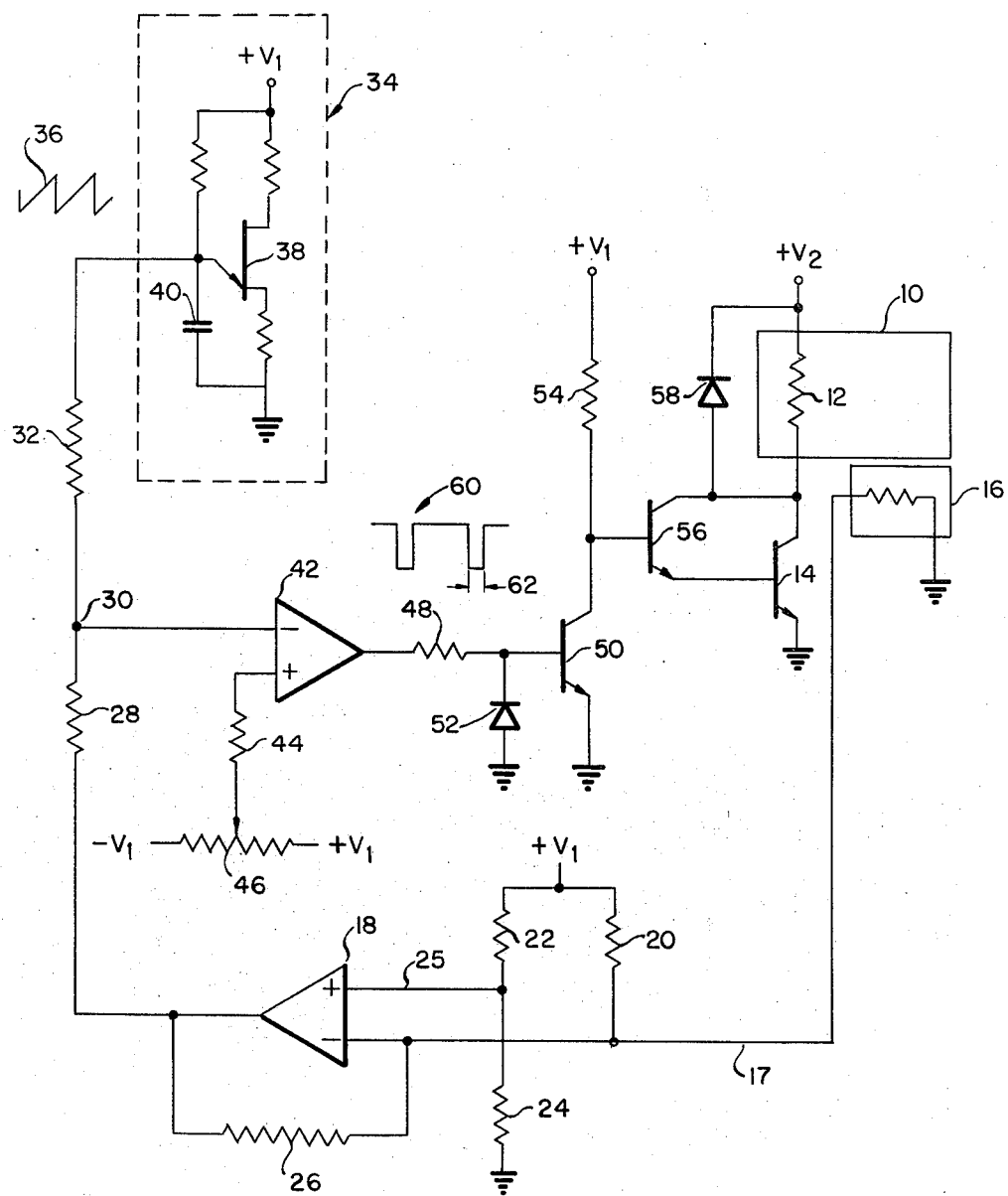

PRECISION TEMPERATURE CONTROLLER

BACKGROUND OF THE INVENTION

This invention relates to a precision controller of d.c. power, and more particularly to a precision temperature controller.

In many applications precise control of d.c. power is necessary. This need is particularly so in the instrumentation field requiring precision temperature control of a sample to be analyzed. For example, to obtain precise measurement with a spectrophotometer it is desirable to control the temperature of the sample to be analyzed at a predetermined temperature within ±0.1° C. The heaters utilized for heating the sample are generally resistive elements in thermal relation to the sample to be heated. Conventional bimetallic thermostatic elements used to control the application of voltage to the resistive heating element provide too high a degree of error about the desired temperature.

SUMMARY OF THE INVENTION

Accordingly, it is an object of the invention to provide a new and improved d.c. power control device.

It is a further object of this invention to provide a new and improved precision temperature controller for d.c. energized heating elements.

The foregoing and other objects of the invention are accomplished by providing a variable resistive temperature sensor in thermal relation with a direct current energized heating element, the temperature sensor being connected in a Wheatstone bridge circuit, the output thereof being detected by a gained differential amplifier to derive an error signal. The error signal so derived is summed with a sawtooth voltage to provide a first input to a differential amplifier connected in a comparator mode, the second inputs thereof being coupled to a voltage source such that the output thereof turns "on" when the sawtooth voltage wave is at its peak with a zero error signal. As the error signal increases, the comparator output provides a pulse width modulated signal which drives a switching transistor. The switched output drives a power transistor having the heating element connected in series between a voltage source and the collector to emitter path to ground of the power transistor. The circuit thus provides continuous control of the duty cycle of the power transistor from 0 to 100 percent, resulting in a reduction of power dissipated by the power transistor.

The novel features which are believed to be characteristic of the invention are set forth with particularity in the specification which can best be understood by reference to the following description and accompanying drawing.

BRIEF DESCRIPTION OF THE DRAWING

The sole FIGURE is a schematic diagram of a precision temperature controller circuit in accordance with the invention.

DESCRIPTION OF THE PREFERRED EMBODIMENT

Referring now to the drawing there is shown a heater 10 having a heating element 12 connected between a voltage source $V_2$ and a collector terminal of a transistor 14, the emitter thereof being coupled to ground. Transistor 14 is a power transistor used for selectively completing the circuit from the voltage source $V_2$ through heating element 12 through the collector-emitter circuit of transistor 14 to ground, to thereby control the heat output of heater 10. In thermal relation with heater 12 is a temperature sensor 16 which is a resistive element, the resistance of which varies with temperature. The temperature sensor 16 may be, for example, a platinum resistance element or a thermistor. One end of sensor 16 is connected to ground while the other end thereof is connected to the inverting input of a gained differential amplifier 18. The input lead 17 of operational amplifier 18 is connected through resistor 20 to a second voltage source designated $+V_1$. The voltage source $V_1$ is also coupled through resistor 22 through a second resistor 24 to ground, with the point intermediate resistors 22 and 24 being connected to a lead 25 coupled to the noninverting input of differential amplifier 18. As can be seen, the temperature sensing element 16, resistor 20, resistor 22 and resistor 24 form a Wheatstone bridge circuit, wherein resistors 20 and 22 have an identical resistance value, and the voltage differential between lead 17 and lead 25 is zero when resistor 24 is equal to the resistance of the variable resistive element of the temperature sensor 16.

Differential amplifier 18 has a resistor 26 connected between lead 17 and the output thereof to provide a feedback path for amplifier 18. The gain of amplifier 18 is determined by the ratio of the value of resistor 26 to the resistance of the element of temperature sensor 16. The output of amplifier 18 provides an error signal which passes through current limiting resistor 28 to a summing node 30. The summing node 30 receives a second signal through current limiting resistor 32 from a relaxation oscillator generally designated 34 which produces the sawtooth wave signal voltage generally designated 36. The relaxation oscillator 34 employs a unijunction transistor 38 suitably biased from a voltage source $+V_1$ to selectively charge and discharge a capacitor 40 to produce the signal 36 in a conventional manner.

The resulting signal appearing at summing node 30 is applied to the inverting input of a second differential amplifier 42 which is a gained differential amplifier used in a comparator mode. The noninverting input of amplifier 42 is coupled through a fixed resistor 44 to the center tap of a potentiometer 46 having one end thereof coupled to a positive source of voltage $(+V_1)$ and the other end thereof connected to a negative source of voltage $(-V_1)$ to provide a voltage differential across potentiometer 46 of twice the value of voltage source $V_1$. The output of amplifier 42 is coupled through resistor 48 to the base of switching transistor 50 which has the emitter thereof connected to ground and a protective diode 52 connected between the emitter and base thereof. The collector of transistor 50 is coupled to a voltage source $+V_1$ through resistor 54. The collector of transistor 50 is coupled to the base of a second transistor 56 which has the emitter thereof controlling the base of power transistor 14 while the collector thereof is coupled to the collector of transistor 14. A second protective diode 58 is connected in parallel with heating element 12 to protect transistors 14 and 56 against any inductance of heater 12.

The operation of the circuit will now be discussed in detail and it is to be understood that while the description will proceed on the basis of a temperature controller, the circuit has application in many other instances in which direct current power is to be controlled precisely. Initially amplifiers 18 and 42 are precision operational amplifiers such as instrumentation grade monolithic operational amplifiers. Furthermore, while resistor 24 is shown to be a fixed resistance, in actual usage resistor 24 is a variable resistor which is preset to a desired resistance equal to the resistance of sensing element 16 at the desired temperature. For example, if sensing element 16 is a platinum resistance wire having a resistance of 120 ohms at the desired temperature, resistor 24 will likewise be 120 ohms. Resistors 20 and 22 may be for example 3,000 ohms and voltage source $V_1$ is 15 volts. As previously stated, the gain of the amplifier 18 is determined by the ratio of resistor 26 to the resistance of sensor 16, and with resistor 26 set at a value of 100 K ohms the amplifier gain is approximately 1,000. The output of amplifier 18 is the error signal which is passed through resistor 28 (470 K ohms) to summing node 30. Resistor 32 has the same resistance value as resistor 28 and the sawtooth signal 36 from wave generator 34 passing therethrough is summed at summing node 30 with the error signal. The sum so obtained is applied to the inverting input of differential amplifier 42 which has the noninverting input thereof passing through resistor 34 (240 K ohms) to the center tap of a 20 K ohm potentiometer 46 having a voltage thereacross of +15 volts ($+V_1$) at one end to −15 volts ($-V_1$) at the other end. The output waveform emanating from amplifier 42 is illustrated by the pulsed wave generally designated 60 where the pulse width 62 is determined by the order of magnitude of the error signal from differential amplifier 18. Amplifier 42 is utilized as a precision comparator in which the output thereof is either "on" or "off." The center tap of potentiometer 46 is initially set to a position wherein amplifier 42 turns "on" when the sawtooth wave 36 is at its peak voltage with zero error signal output from differential amplifier 18. The polarity of the inputs to amplifiers 18 and 42 is set so that as the signal error increases amplifier 42 is turned "on" further down the positive rising slope which increases the pulse width 62 of the pulsed output 60 to thereby increase the duty cycle of power transistor 14. The pulsed signal 60, that is the output of amplifier 42, is applied through resistor 48 to the base of transistor 50. When the pulse 60 is high, switching transistor 50 conducts, thereby causing the base of transistor 56 to be at approximately ground potential. Transistor 56 is an amplifier transistor, and when the pulse 60 goes "low" for the pulse duration determined by pulse width 62, transistor 50 becomes nonconductive whereby transistor 56 and power transistor 14 conduct. When power transistor 14 conducts, the circuit is completed through voltage source $+V_2$ (approximately 12 volts at 2 amps) through heater 12 and through transistor 14 from collector to emitter to ground. The time duration of energization of the heater 12 is governed by the width 62 of the pulses of the pulse train 60, with pulse width is determined by the error signal generated by the differential resistance between resistor 24 and the resistance of temperature sensing element 16.

While the description of the preferred embodiment has proceeded on the basis of the invention being utilized as a precision temperature controller, it is to be understood that the same circuitry can be utilized for precision control of any d.c. power wherein a variable resistive sensing element is utilized to sense the d.c. power, such element being coupled to the d.c. power generating element to control variations thereof from a predetermined level. Consequently other adaptations and modifications may be made within the spirit and scope of the invention.

I claim:

1. In a direct current power control system, the combination comprising:
    a direct current energized power device;
    switching means for selectively coupling said device to a power source;
    means for sensing the power consumed by said device;
    reference means for establishing a predetermined power level;
    means electrically coupled to said reference means and said sensing means for producing an error signal proportional to the variation in said sensing means from the predetermined power level;
    means for generating a sawtooth wave signal;
    means for summing said sawtooth wave signal and said error signal;
    means coupled to the summed signal for producing a train of pulses, said pulses having a pulse width proportional to said error signal;
    means coupling the train of pulses to said switching means for energizing said switching means for a time period proportional to the pulse width.

2. The combination according to claim 1 wherein said switching means is a transistor; and said sensing means and said reference means are resistive devices connected in a bridge circuit.

3. The combination according to claim 1 wherein said means for producing a train of pulses is a differential amplifier having one input thereof coupled to receive said summed signal, and the other input thereof is coupled to a reference signal preset at a level to produce no pulses in the absence of an error signal.

4. The combination according to claim 3 wherein said power device and said switching means comprise a heating element connected in series with the collector-to-emitter portion of a transistor.

5. The combination according to claim 4 wherein said sensing means is a variable resistive device in intimate thermal relation with said heating element, said reference means is a resistive device, and said sensing means and said reference means are electrically connected in a bridge circuit to produce said error signal.

* * * * *